United States Patent
Horimai (10) Patent No.: US 7,663,995 B2
(45) Date of Patent: Feb. 16, 2010

(54) OPTICAL RECORDING MEDIUM RECORDING CONTROL METHOD, RECORDING CONTROL DEVICE AND INSPECTION METHOD

(75) Inventor: Kiyoshi Horimai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 545 days.

(21) Appl. No.: 11/064,936

(22) Filed: Feb. 25, 2005

(65) Prior Publication Data
US 2005/0190673 A1 Sep. 1, 2005

(30) Foreign Application Priority Data
Feb. 27, 2004 (JP) ............... 2004-054453

(51) Int. Cl.
*G11B 7/00* (2006.01)
(52) U.S. Cl. .................................. 369/47.53
(58) Field of Classification Search ............. 369/53.31, 369/53.35, 53.22, 53.44, 47.5, 47.35, 47.15, 369/59.1–59.13, 59.17, 59.21, 59.26, 134, 369/124.15, 124.08, 99–100, 47.53, 116, 369/112.01, 112.05–112.06, 278, 284–285, 369/54, 47.51, 44.26; 370/514–515, 510; 375/148, 144; 382/251, 232, 270, 271, 272–273, 382/184, 199; 714/375, 314; 356/4.09; 359/579, 359/578; 380/455; 83/234; 365/75
See application file for complete search history.

(56) References Cited

U.S. PATENT DOCUMENTS

| 5,490,127 | A | * | 2/1996 | Ohta et al. ................ 369/47.51 |
| 5,563,862 | A | * | 10/1996 | Udagawa .................. 369/53.24 |
| 5,848,043 | A | * | 12/1998 | Takada et al. ................ 369/116 |
| 6,931,586 | B1 | * | 8/2005 | Shim et al. ................... 714/800 |
| 6,996,052 | B1 | * | 2/2006 | Mizuno et al. ............ 369/275.1 |

FOREIGN PATENT DOCUMENTS

| JP | 6-236553 | A |   | 8/1994 |
| JP | 9-171641 | A |   | 6/1997 |
| JP | 2002-237041 | A |   | 8/2002 |
| JP | 2002-260230 | A |   | 9/2002 |
| WO | WO0014735 |   | * | 3/2000 |

* cited by examiner

*Primary Examiner*—Nabil Z Hindi
(74) *Attorney, Agent, or Firm*—Sughrue Mion, PLLC (57) ABSTRACT

An evaluation pattern, for evaluating the extent of occurrence of thermal interference, is recorded with recording power being varied stepwise from a low recording power to a high recording power. This test-written evaluation pattern is played back, and levels of occurrence of thermal interference are quantified for each recording power level of the recording. Then, recording power is set to a value such that a quantified value therefor is smaller than a pre-specified slice level. For the slice level, a measured value of PI errors (correctable errors) for carrying out acceptable recording is found, and the slice level is determined by finding a variation amount that corresponds to this measured value of PI errors.

29 Claims, 6 Drawing Sheets

OPTICAL RECORDING MEDIUM RECORDING CONTROL METHOD, RECORDING CONTROL DEVICE AND INSPECTION METHOD

CROSS-REFERENCE TO RELATED APPLICATION

This application claims priority under 35 USC 119 from Japanese patent application, No. 2004-054453, the disclosure of which is incorporated by reference herein.

BACKGROUND OF THE INVENTION

1. Field of the Invention

The present invention relates to a recording control method, recording control device and inspection method of an optical recording medium, and more particularly to a recording control method, recording control device and inspection method for an optical recording medium which employs an organic dye which is suitable for high-speed recording of the optical recording medium.

2. Description of the Related Art

Optical recording media (optical discs) are known on which information can be recorded in write-once modes and the like with laser light. Among these optical discs, optical discs with greater recording capacity than flexible discs are known ("CD-R"). Recording of information thereon is performed by irradiating a CD-R with laser light in the near infrared region (for example, a wavelength in the vicinity of 780 nm). The recording of information is realized by a change in optical characteristics due to an irradiated region of a recording layer absorbing the laser light, experiencing a localized temperature rise, and physically or chemically changing (for example, pits being created).

In recent years, with the advance of digitalization throughout society, volumes of information to be distributed have been generally increasing. In response to demands for optical recording media with greater capacities, larger capacity optical discs (write-once digital versatile discs, known as DVD-R, DVD-RW, etc.) are now being marketed. These DVD-Rs and the like are formed by providing a recording layer formed with a dye, a light reflection layer and, as necessary, a protective layer in this order on a transparent disc-form substrate. In this substrate, a guide groove for tracking of irradiated laser light (a pre-groove) is formed at least half as narrowly as in a CD-R (i.e., at 0.74 to 0.8 µm). For recording and playback of information on DVD-Rs, laser light of wavelengths shorter than for CD-Rs (for example, wavelengths of 630 to 680 nm) is irradiated, and thus higher density recording than in CD-Rs is possible.

Anyway, at a CD-R/W, DVD-R/RW or DVD+R/RW, a PCA (power calibration area) region for performing calibration of recording laser power is provided at a predetermined position at an innermost periphery or an outermost periphery of the disc. At this PCA region, block units are defined. Using these plural block units, recording formats and recording signals of a particular recording apparatus from a particular company are written and played back, and an optimal recording power for carrying out recording is determined.

For example, describing a DVD-R as an example, hitherto, a particular pattern (for example, a pattern in which 3T and 14T marks are repeated, or the like) has been test-written with recording power being changed in a stepwise manner. Actual recording has been performed with a recording power at which a target β value, which was recorded beforehand at substrate land pre-pits (LPPs) of the DVD-R, is obtained.

Now, a technology, described in Japanese Patent Application Laid-Open (JP-A) No. 6-236553, has been proposed in which, just before shipment of a disc or just, before recording, an evaluation pattern is recorded at an optical recording medium. The evaluation pattern, in which data ones ("1") and zeros ("0") are recording data of a modulated binary signal, includes at least a thermal/optical interference region, which is a range in which, through a recording and playback process, a particular data one is affected by surrounding data ones or zeros. Positions of data ones or zeros relative to reference positions are found. With a binarized signal of playback data obtained from this evaluation pattern, positional offsets between the positions of data ones or zeros relative to the reference positions and positions of data ones or zeros of the playback data corresponding thereto are detected. These positional offsets are analyzed, and thus variations of the binary signal that have occurred in the recording and playback process are detected.

Further, a technology, described in JP-A No. 2002-237041, has been proposed in which a level of a portion of a playback signal corresponding to a repeated pattern y, played back from a magneto-optical disc on which information has been recorded by a light beam, and a level of a portion of the playback signal corresponding to a solitary mark pattern x are detected. Recording conditions are determined by comparison of these levels. Specifically, a high level (or low level) of the playback signal corresponding to the repeated pattern y is compared with a high level (or low level) of a portion of the playback signal that corresponds to the solitary mark pattern x, and a recording power is set such that the levels are the same. When the recording power is determined in this manner, thermal interference can be made equal between recording marks corresponding to different mark patterns.

However, in high-speed recording of optical recording media, the effects of thermal interference become even more significant. Specifically, a power margin at a high power side (an asymmetry increasing side) is reduced, and a small increase in recording power leads to a sharp increase in jitter and errors. Therefore, recording with higher recording power is not desirable in regard to the medium. However, in regard to the drive, in order to preserve margins during playback, it is desirable to record with a recording power at which asymmetry is increased (i.e., recording power is increased) as much as is feasible.

As described above, given the circumstances in regard to the medium and in regard to the drive, a number of deficiencies in the related art still exist. Thus, a technique which, when high-speed recording is to be performed, specifies a recording power which is as high as possible and ensures that satisfactory recording can actually be carried out in practice is required. The present invention seeks to correct these deficiencies and has been devised in consideration of the circumstances described above, and provides an optical recording medium recording control method, recording control device and inspection method which are capable of assigning a recording power as high as possible in a range with which satisfactory recording is possible.

Now, the technology described in JP-A No. 6-236553 provides recommendations as far as detection of variations of playback signals, but does not go on to discuss how to assign recording powers in practice.

Meanwhile, the technology described in JP-A No. 2002-237041 compares the high level (or low level) of the playback signal corresponding to the repeating pattern with the high level (or low level) of the portion of the playback signal corresponding to the solitary mark pattern and assigns a recording power such that these levels are equal. However, there is no consideration of recording with recording powers that are any higher. That is, there are no suggestions pertaining to a method of determining recording power in the context of high-speed recording.

SUMMARY OF THE INVENTION

The present invention has been devised in consideration of the circumstances described above, and provides an optical recording medium recording control method, recording control device and inspection method which are capable of assigning a recording power as high as possible in a range with which satisfactory recording is possible.

An optical recording medium recording control method of a first aspect of the present invention is a recording control method of an optical recording medium at which information is recordable by at least irradiation with laser light, and includes: recording of test-writing an evaluation pattern for evaluating levels of incidence of thermal interference at the optical recording medium, in which recording power is altered in a stepwise manner; detecting of playing back the evaluation pattern which has been test-written by the recording, quantifying the incidence levels of thermal interference at the evaluation pattern, and detecting variation amounts of the incidence levels; and assigning of finding a variation amount that corresponds to a pre-specified measured value of a correctable error rate, setting this variation amount as a threshold value for the variation amounts detected in the detecting, and assigning a recording power on the basis of this threshold and the variation amounts detected by the detecting.

According to the first aspect of the present invention, in the recording, the test-writing at the optical recording medium of the evaluation pattern for evaluating the incidence levels of thermal interference is carried out with the recording power being varied stepwise (for example, being varied in a stepwise manner from a low recording power to a high recording power).

In the above detecting, the evaluation pattern which has been test-written on the optical recording medium is replayed, and the levels of thermal interference are quantified for detecting the variation amounts.

Then, in the above assigning, a variation amount that corresponds to the pre-specified correctable measured value (for example, a measured rate of PI errors with which satisfactory recording is possible) is found, is set as the threshold value of the variation amounts detected in the detecting, and the recording power is assigned in accordance with this threshold value and the variation amounts detected by the detecting. That is, the variation amount corresponding to the PI error rate with which satisfactory recording is possible (for example, a PI error rate of less than 280) is found, this serves as a threshold value for the variation amounts detected by the detecting, and a recording power for which the variation amounts are as large as possible but smaller than the threshold value is assigned as the recording power for when actual recording is carried out.

When recording is carried out with the recording power that has been determined in this manner, because the recording power has been assigned in a range in which recording with an acceptable PI error rate is possible, satisfactory recording is enabled. Furthermore, because a recording power for which the variation amount is close to the threshold value found from the pre-specified measured rate of PI errors is set as the recording power for the time of actual recording, it is possible to set the recording power as high as possible in the range in which satisfactory recording is possible.

In the above assigning, if a target recording power (the "target β value"), which has been recorded on the optical recording medium beforehand, is smaller than the assigned recording power, the target recording power may be assigned as the recording power instead. In such a case, it will still be possible to perform preferable recording.

An optical recording medium recording control device of a second aspect of the present invention is a recording control device of an optical recording medium at which information is recordable by at least irradiation with laser light, and includes: a recording section which test-writes an evaluation pattern for evaluating levels of incidence of thermal interference at the optical recording medium, in which test-writing recording power is altered in a stepwise manner; a detection section which plays back the evaluation pattern which has been test-written by the recording section, quantifies the incidence levels of thermal interference at the evaluation pattern, and detects variation amounts of the incidence levels; and an assignment section which finds, in advance, a variation amount that corresponds to a pre-specified measured value of a correctable error rate, sets this variation amount as a threshold value for the variation amounts detected by the detection section, and assigns a recording power on the basis of this threshold and the variation amounts detected by the detection section.

According to the second aspect, at the recording section, the test-writing at the optical recording medium of the evaluation pattern for evaluating the incidence levels of thermal interference is done with the recording power being varied stepwise. For example, the recording power is varied in a stepwise manner from a low recording power to a high recording power for recording the evaluation pattern at the optical recording medium.

At the detection section, the evaluation pattern which has been test-written at the optical recording medium is replayed, and the levels of thermal interference at the evaluation pattern are quantified for detecting the variation amounts.

Further, at the assignment section, a variation amount that corresponds to the pre-specified correctable measured value (for example, a measured rate of PI errors with which satisfactory recording is possible) is found in advance, is set as the threshold value of the variation amounts detected by the detection section, and the recording power is assigned in accordance with this threshold value and the variation amounts detected by the detection section. That is, the variation amount corresponding to the PI error rate with which satisfactory recording is possible (for example, a PI error rate of less than 280) is found, this serves as a threshold value for the variation amounts detected by the detection section, and a recording power for which the variation amounts are as large as possible but smaller than the threshold value is assigned as the recording power for when actual recording is carried out.

When recording is carried out with the recording power that has been determined by the assignment section in this manner, because the recording power has been assigned in a range for which recording with an acceptable PI error rate is possible, satisfactory recording is enabled. Furthermore, because a recording power for which the variation amount is close to the threshold value found from the pre-specified measured rate of PI errors is set as the recording power for the time of actual recording, it is possible to set the recording power as high as possible in the range in which satisfactory recording is possible.

Here, if a target recording power (the "target β value") which has been recorded at the optical recording medium beforehand is smaller than the assigned recording power, the assignment section may assign the target recording power as the recording power instead. Consequently, it is possible to assign a recording power even higher within a range which is tolerable for the optical recording medium.

An optical recording medium inspection method of a third aspect of the present invention is an inspection method of an optical recording medium at which information is recordable by at least irradiation with laser light, and includes: recording of recording an evaluation pattern for evaluating levels of incidence of thermal interference at the optical recording medium, with one of a recording power that is altered in a stepwise manner and a specific recording power; detecting of playing back the evaluation pattern which has been test-written by the recording, quantifying the incidence levels of thermal interference at the evaluation pattern, and detecting variation amounts of the incidence levels; and determining of finding a variation amount that corresponds to a pre-specified measured value of a correctable error rate, setting this variation amount as a threshold value for variation amounts detected in the detecting, and determining whether or not the medium is suitable for high-speed recording on the basis of this threshold and the variation amounts detected by the detecting.

According to the third aspect, in the above recording, the recording at the optical recording medium of the evaluation pattern for evaluating the incidence levels of thermal interference is carried out with the recording power being varied stepwise (for example, being varied in a stepwise manner from a low recording power to a high recording power) or with a particular recording power.

In the above detecting, the evaluation pattern which has been test-written at the optical recording medium is replayed, and the levels of thermal interference are quantified for detecting the variation amounts.

Then, in the above determining, a variation amount that corresponds to the pre-specified correctable measured value (for example, a measured rate of PI errors with which satisfactory recording is possible) is found, is set as the threshold value of the variation amounts detected in the detecting, and it is determined whether or not the medium is suitable for high-speed recording in accordance with this threshold value and the variation amounts detected by the detecting.

In the third aspect, the above may be used, for example, in inspection of an optical recording medium in an inspection step of a process of fabricating the optical recording medium.

According to the present invention as described above, there is an effect in that it is possible to assign a recording power as high as possible in a range in which satisfactory recording is possible.

DETAILED DESCRIPTION OF THE INVENTION

Herebelow, an example of an embodiment of the present invention will be described in detail with reference to the drawings.

First, an optical disc 10 which can be employed as an optical recording medium of the present invention will be described. This optical disc 10 is structured to be capable of write-once recording as a DVD-R, a DVD-RW or the like. The optical disc 10 can be recorded by laser light with a wavelength between 500 nm and 700 nm, and is provided with good recording and playback characteristics.

Figure 1:
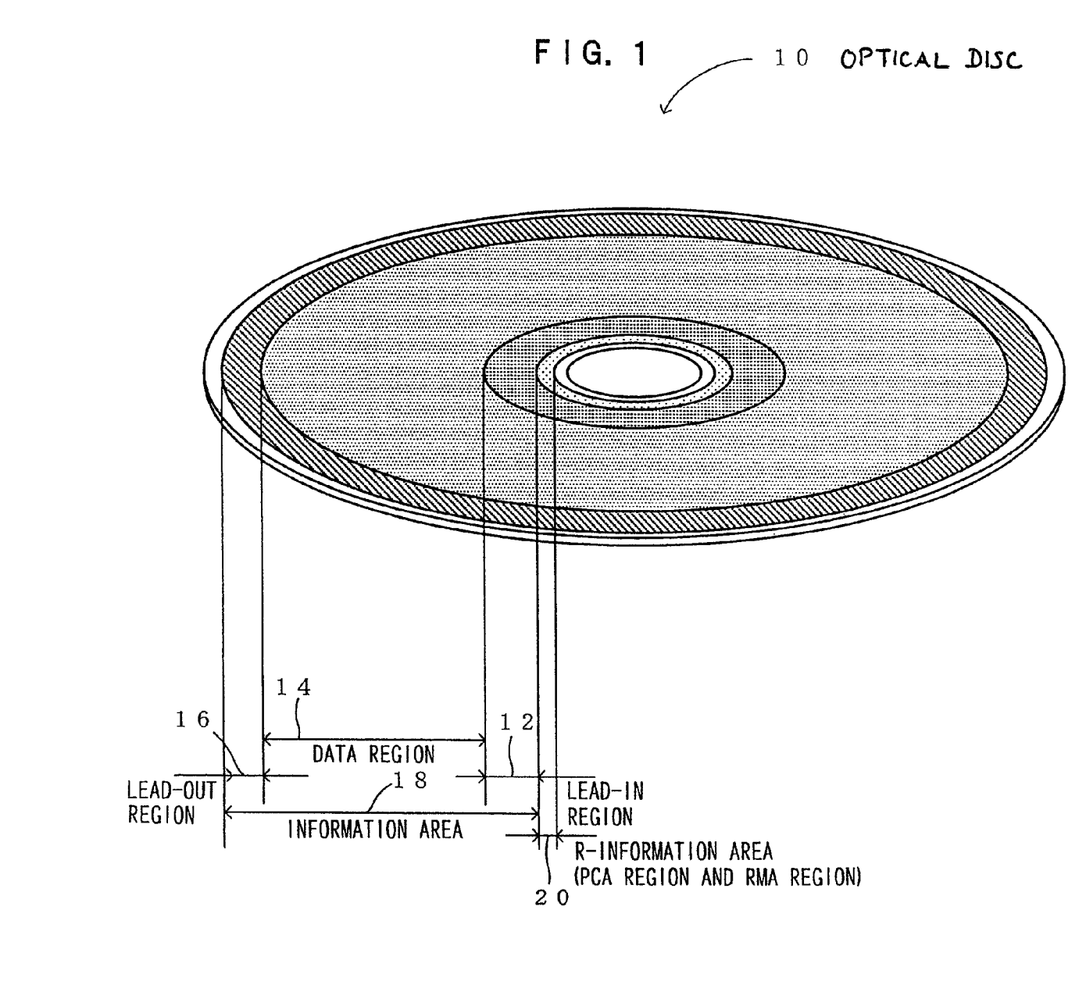
FIG. 1 is a view showing an optical disc employable as an optical recording medium relating to an embodiment of the present invention.

As shown in FIG. 1, the optical disc 10 is provided with an information area 18 for recording various kinds of information. The information area 18 is constituted of a lead-in region 12, a data region 14, and a lead-out region 16, which is formed in accordance with requirements, in this order from an inner periphery toward an outer periphery of the optical disc 10. The data region 14 is also referred to as "the zone", and the information area 18 is divided into regions at which data can be recorded and played back in sector units.

An R-information area 20 is provided at an inner peripheral side relative to the information area 18. The R-information area 20 is constituted with a PCA (power calibration area) region and an RMA (recording management area) region. The PCA region and the RMA region are provided for calibration of recording laser power (the PCA region), for recording management information which is required by recording apparatuses (the RMA region) and the like. For example, recording management information (recording conditions such as a Drive ID, recording power, power calibration address, etc.) is recorded at the RMA region. The PCA region and the RMA region are provided in this order from the inner periphery toward the outer periphery of the optical disc 10.

A laser light guide groove, referred to as "the groove", is formed in the optical disc 10, and data is recorded in the groove. This guide groove is formed with a wobble which meanders with a predetermined amplitude and cycle length. Signals for control of a motor and gate signals for detecting isolated pits are formed by this wobble. Isolated pits (below referred to as land pre-pits), which are formed in accordance with pre-specified rules, are formed at lands, which are regions between the guide groove and neighboring guide groove. These land pre-pits are utilized for high-accuracy positioning at times of data recording, and are used for obtaining recording addresses and other information that is necessary for recording.

During tracking, a signal from a pre-format, which is recorded on the optical disc 10 that is a DVD-R or DVD-RW disc or the like, is detected by detection of differentials of laser light reflected from the optical disc 10.

Next, a recording/playback apparatus 22, which is capable of writing and reading information on the optical disc 10 will be described.

Figure 2:
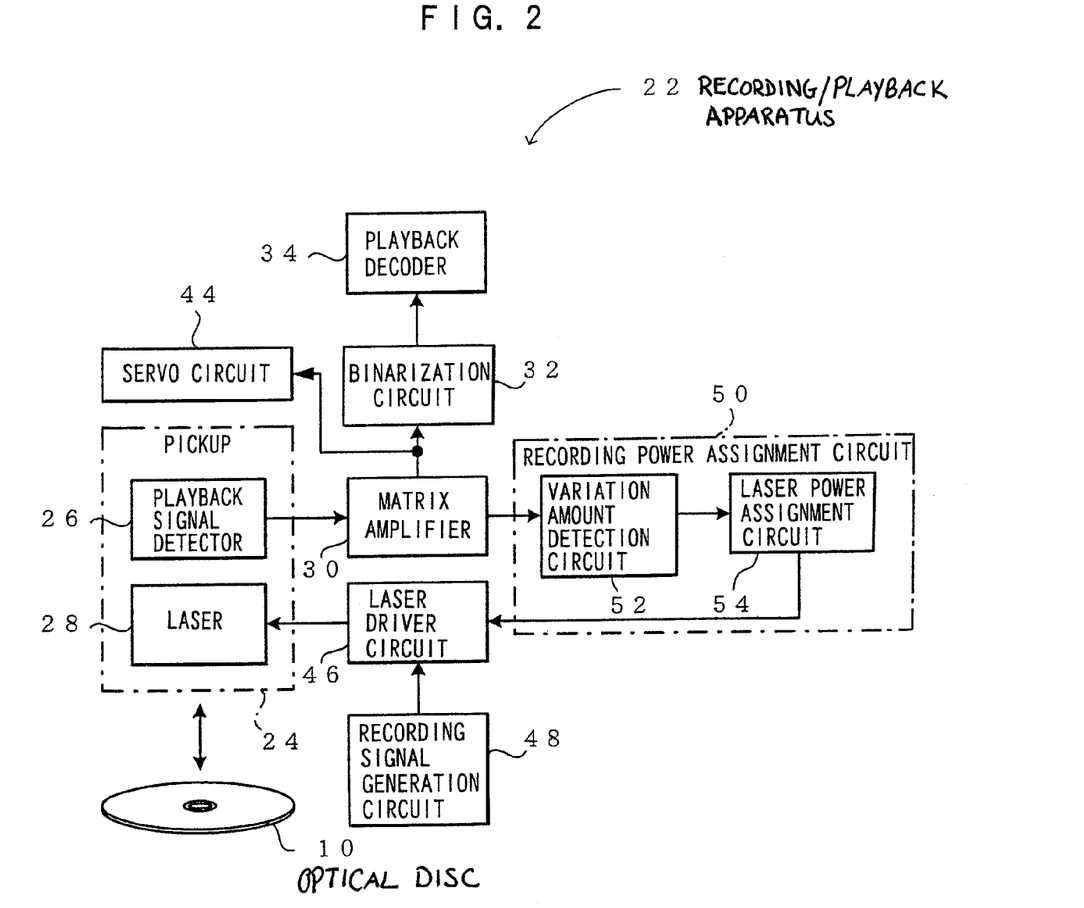
FIG. 2 is a block diagram showing structure of a recording and playback apparatus relating to the embodiment of the present invention.

As shown in FIG. 2, the recording/playback apparatus 22 is equipped with a pickup 24, which irradiates laser light for playback or recording onto the optical disc 10. The pickup 24 is provided with a playback signal detector 26 and a light source such as a semiconductor laser 28. The playback signal detector 26 is structured for detecting light reflected from the optical disc 10 with a photo-detector which is divided into four divisions. A matrix amplifier 30 is connected to the playback signal detector 26. Detection signals from the playback signal detector 26 are inputted into the matrix amplifier

30. The matrix amplifier 30 performs signal processing of the four detection signals from the playback signal detector 26, and generates and outputs playback signals (RF signals), phase difference signals (DPD signals, not illustrated) and push-pull signals (PP signals).

An output side of the matrix amplifier 30 is connected to a binarization circuit 32. The binarization circuit 32 is for binarizing the inputted playback signals. That is, the binarization circuit 32 is a circuit which converts the playback signals, which are analog signals, to digital signals. The binarization circuit 32 performs the binarization by setting high-level playback signals whose levels exceed a predetermined value at a predetermined sampling frequency, to a predetermined digital value (for example, one ("1")) and setting other, low-level playback signals to another predetermined digital value (for example, zero ("0")). The binarization circuit 32 outputs these digital signals as binary data.

An output of the binarization circuit 32 is inputted into a playback decoder 34.

The output of the matrix amplifier 30 (the output of the PP signals) is also connected to a servo circuit 44. The servo circuit 44 controls the pickup 24. The servo circuit 44 includes a processing section for causing a laser spot to track a predetermined focusing position and tracking position, and operates a focusing servo and a tracking servo in accordance with the output signals from the matrix amplifier 30.

The semiconductor laser 28 provided at the pickup 24 is connected, via a laser driver circuit 46, with a recording signal generation circuit 48. At the recording signal generation circuit 48, pulse counts, pulse widths, frequencies and the like are specified, in order to drive the semiconductor laser 28 for recording onto the optical disc 10.

The laser driver circuit 46 is a driving circuit for driving the semiconductor laser 28. The laser driver circuit 46 drives the semiconductor laser 28 such that the semiconductor laser 28 is turned on and off in accordance with pulse signals from the recording signal generation circuit 48.

Prior to recording onto the optical disc 10, the recording signal generation circuit 48 also performs test-writing to the PCA region of the optical disc 10. The recording signal generation circuit 48 specifies evaluation pulses (an evaluation pattern) for driving the semiconductor laser 28 at this time.

The recording/playback apparatus 22 of the present embodiment is also equipped with a recording power assignment circuit 50. The laser power when recording onto the optical disc 10 is to be performed is determined by the recording power assignment circuit 50.

The recording power assignment circuit 50 is structured by a variation amount detection circuit 52 and a laser power assignment circuit 54. The variation amount detection circuit 52 is connected to the matrix amplifier 30.

The variation amount detection circuit 52 detects variation amounts of low levels, at minimum-length marks (for example, 3T marks or the like), of the playback signals outputted from the matrix amplifier 30 (the RF signals). The laser power assignment circuit 54 sets the recording power at the time of recording onto the optical disc 10 to a recording power for which the variation amounts detected by the variation amount detection circuit 52 are lower than a pre-specified slice level. Here, the slice level is a quantity which depends on error correction capabilities of the recording/playback apparatus 22 and on matching of recording strategies.

The variation amount detection circuit 52 may be formed so as to detect, from output from the binarization circuit 32, variation amounts of positions of that output relative to a reference signal (a clock).

Next, a method of assigning laser power, which is implemented by the recording/playback apparatus 22 structured as described above, will be described.

Figure 3:
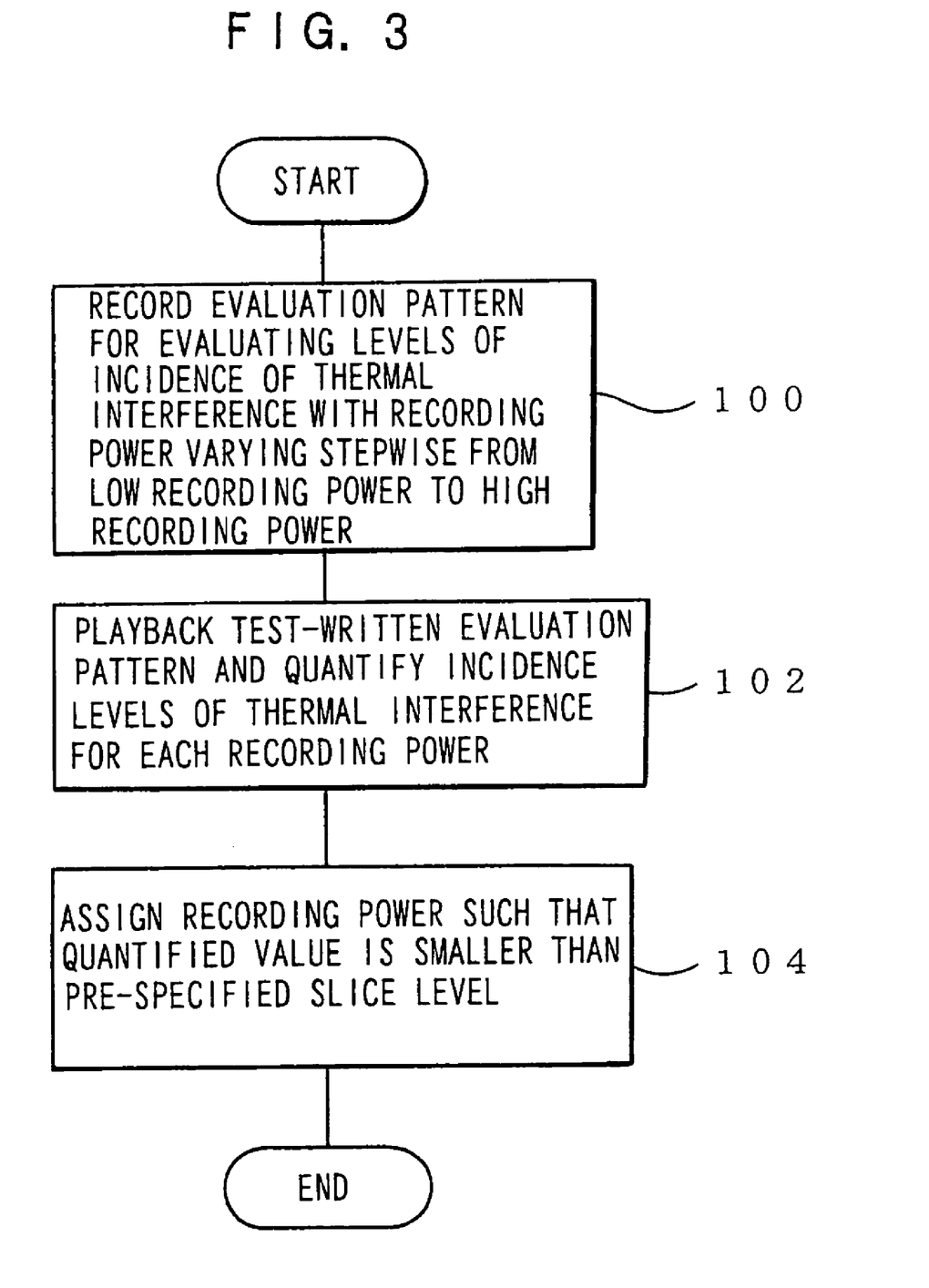
FIG. 3 is a flowchart showing a procedure of a laser power assignment method relating to the embodiment of the present invention.

In the present embodiment, to assign a recording power with which pit length variations due to thermal interference will not occur (i.e., with which error will not have a fatal value), the recording power is assigned by the procedure illustrated in FIG. 3.

First, an evaluation pattern for evaluating levels of incidence of thermal interference is recorded, with the recording power being varied stepwise from a low recording power to a high recording power (step 100). Specifically, the recording signal generation circuit 48 specifies pulses such that this pre-specified evaluation pattern will be recorded and inputs the specified pulses to the laser driver circuit 46. Hence, laser light is irradiated to the PCA region of the optical disc 10 and the evaluation pattern is recorded (test-written) by the laser light.

In general, thermal interference is most noticeable at the minimum-length marks, depends on the lengths of spaces before and after the minimum-length marks, and is manifested as an effect in which the length of the minimum-length marks varies. Therefore, the evaluation pattern will be satisfactory if it is a combination of the minimum-length marks with spaces of various lengths.

Thereafter, the evaluation pattern that has been test-written is played back and incidence levels of thermal interference are quantified for the respective recording powers of the recording (step 102). The following two methods may be considered as methods for quantifying levels of thermal interference: a method of binarizing the playback signals and detecting variation amounts of positions relative to reference clocks; and a method of detecting variation amounts of the low level of the playback signals at the minimum-length marks. With such methods, it is possible to quantify levels of thermal interference. In the present embodiment, variation amounts of the low level in the playback signals of the minimum-length marks are detected by the variation amount detection circuit 52.

Then, the recording power is assigned such that the quantified values are values smaller than a pre-specified slice level (step 104). In the present embodiment, the actual recording is executed with a recording power for which the variation amounts are not above the pre-specified slice level. Specifically, in the present embodiment, the recording power is set by the laser power assignment circuit 54 such that the variation amounts will not be above the pre-specified slice level. Consequently, it is possible to assign an optimum recording power.

In the present embodiment, the slice level is determined by finding a measured value of PI errors (correctable errors) with which acceptable recording can be performed, and finding a variation amount that corresponds to this measured value of the PI errors. In other words, a recording power is assigned at which a variation amount of the low level at the minimum-length marks is the slice level that has been found from the measured value of PI errors that enables the performance of satisfactory recording. Thus, the occurrence of PI errors can be suppressed, and acceptable recording can be carried out.

The method of quantifying the incidence levels of thermal interference described above may be implemented in an inspection step during fabrication of the optical disc 10. In such a case, it is possible, by performing a pass-fail judgment with the slice level described above, to detect discs that are lacking in suitability for high-speed recording (i.e., which are susceptible to thermal interference).

Now, as an example, an example of a case in which the recording power is assigned by applying the method described above, using a DDU-1000 manufactured by Pulstec Industrial Co., Ltd. as the recording/playback apparatus 22, will be described.

The evaluation pattern employed for performing the assignment of recording power features a repeating pattern of 3T and 11T marks.

Figure 4:
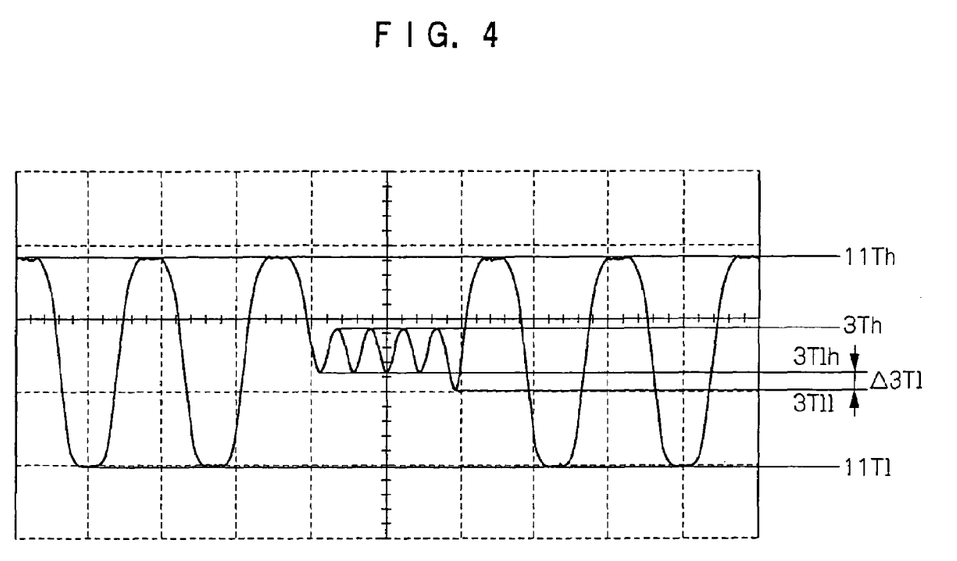
FIG. 4 is a diagram showing a playback signal when recording is carried out on an optical disc at 8× speed and thermal interference is significant.

FIG. 4 is a diagram showing RF signals in a case in which recording is performed at the optical disc 10 at 8× speed and thermal interference is significant. It can be seen that a 3T1 level (the low level of a 3T signal) varies from 3T1h to 3T1l. Note that 11Th represents the high level at the 11T marks, 11T1 represents the low level at the 11T marks and, similarly, 3Th represents the high level at the 3T marks.

Figure 5A:
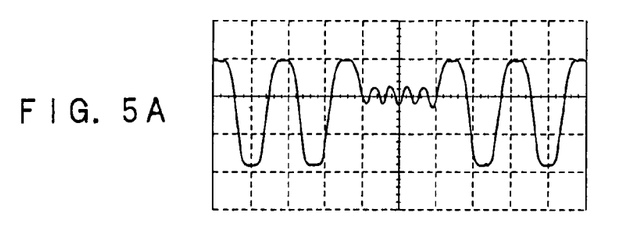
FIGS. 5A to 5E are diagrams showing playback signals of an evaluation pattern formed of 3T and 11T marks with recording power having been varied.
Figure 5B:
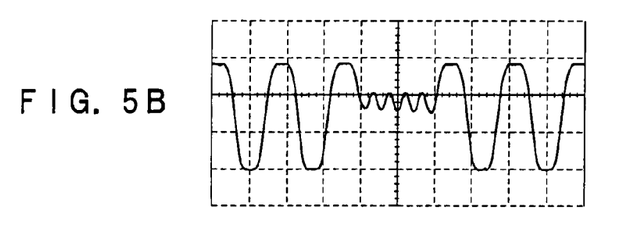
Figure 5C:
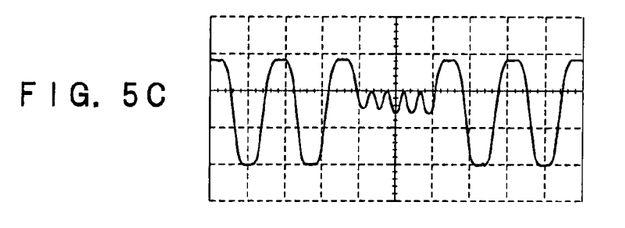
Figure 5D:
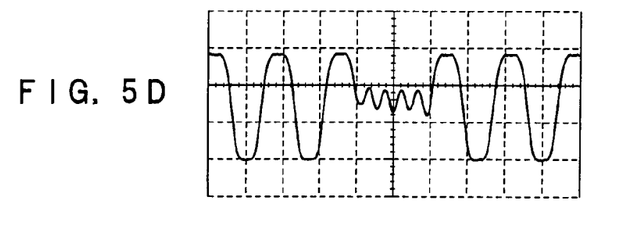
Figure 5E:
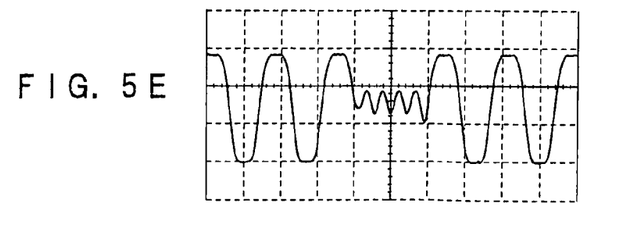

Further, FIGS. 5A to 5E are diagrams showing playback signals of an evaluation pattern formed of 3T and 11T marks with recording power having been varied. FIG. 5A shows the playback signal of the evaluation pattern for a recording power of 28.2 mW, FIG. 5B shows the playback signal of the evaluation pattern for a recording power of 29.0 mW, FIG. 5C shows the playback signal of the evaluation pattern for a recording power of 29.8 mW, FIG. 5D shows the playback signal of the evaluation pattern for a recording power of 30.6 mW, and FIG. 5E shows the playback signal of the evaluation pattern for a recording power of 31.4 mW.

Figure 6:
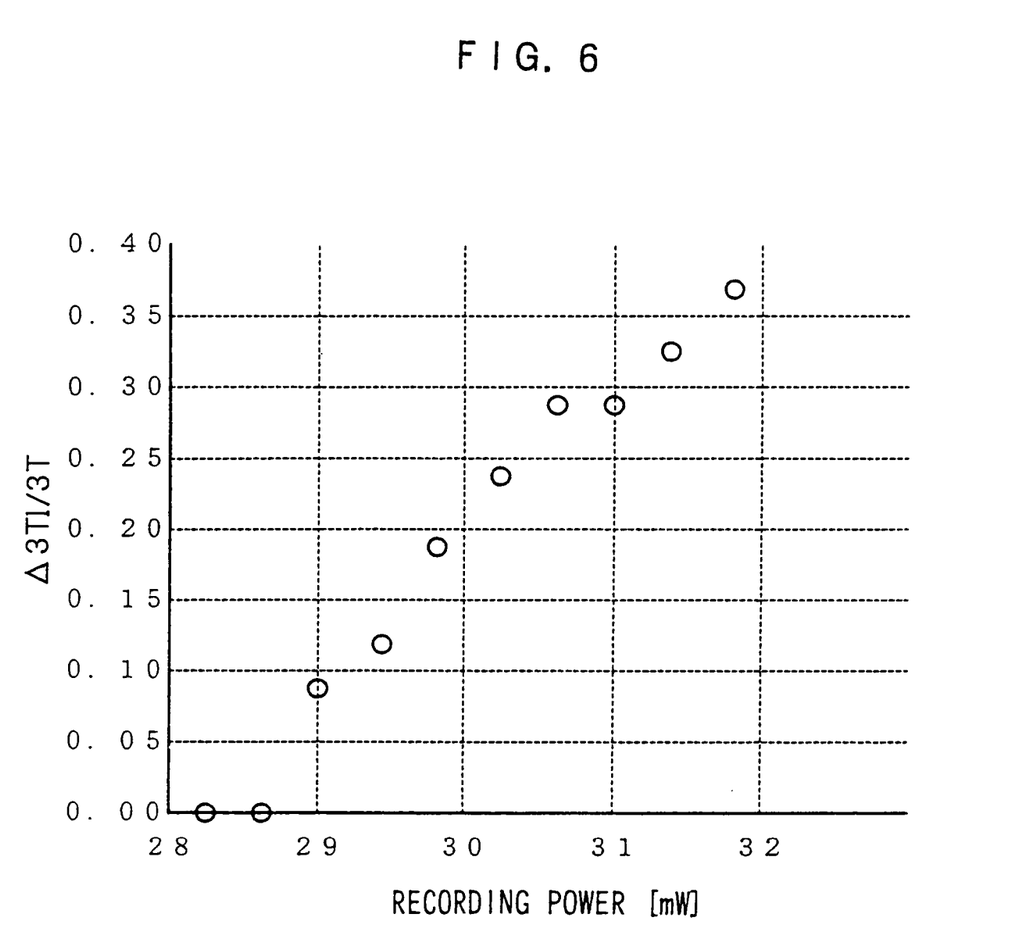
FIG. 6 is a graph showing a characteristic of Δ3T1/3T with respect to alterations in recording power.

Hence, variation amounts of 3T1 (Δ3T1) are standardized over the 3T signals, Δ3T1/3T, is plotted against recording power, as shown in FIG. 6.

As is shown in FIG. 6, as recording power rises, Δ3T1/3T also rises. Here, a measured value of the PI error rate is measured with a usual recording pattern being employed and recording power being varied in a stepwise manner from a low recording power to a high recording power. Accordingly, acceptable recording is performed if the PI error rate is smaller than 280 (PI error rate <280).

Hence, in the present embodiment, a slice level for which the measured value of the PI error rate corresponds with the value of Δ3T1/3T is determined. Specifically, when the value of Δ3T1/3T is associated with a PI error rate <280, the PI error rate will be less than 280 when Δ3T1/3T<0.3. Thus, a slice level of Δ3T1/3T is set to 0.3.

With a recording/playback apparatus of the present embodiment (the DDU-1000), it can be judged from FIG. 6 that recording should be done with a recording power of 31 mW or less. Hence, this value (31 mW) is stored in the laser power assignment circuit 54 to serve as the slice level. Consequently, an optimal recording power can be assigned at the laser power assignment circuit 54.

Herein, the recording of the evaluation pattern is a recording with the recording power being varied in a stepwise manner, and it is preferable if the recording power at such a time has steps of 0.5 mW, even more preferably 0.3 mW steps. Furthermore, 0.1 mW steps are most preferable.

Further, in the present embodiment, in a case in which the recording power assigned as described above is larger than a recording power obtained from a target P value which has been recorded at the optical disc 10 beforehand, rather than the recording power assigned as described above, the target β value may be specified as the recording power. Specifically, at the laser power assignment circuit 54, the target β value is read from the optical disc 10 and the recording power which has been assigned using the above-described slice level is compared with a recording power obtained from the target β value. If the recording power obtained from the target β value is smaller than the recording power obtained from the slice level, then the recording power corresponding to the target β value may be assigned as the recording power for actual recording. In such a case, it will still be possible to perform satisfactory recording.

What is claimed is:

1. A recording control method of an optical recording medium on which information is recordable by at least irradiation with laser light, the method comprising:
    test-writing an evaluation pattern for evaluating levels of incidence of thermal interference on the optical recording medium, including altering recording power in a stepwise manner;
    reading the test-written evaluation pattern to obtain playback signals;
    binarizing the playback signals and detecting variation amounts of positions of the binarized playback signals relative to reference clocks; and
    assigning a recording power, including finding a variation amount in advance that corresponds to a pre-specified measured value of a correctable error rate, setting the found variation amount as a threshold value, comparing the detected variation amounts and the threshold value, and assigning the recording power as high as possible at which the detected variation amounts are smaller than the threshold value.

2. The optical recording medium recording control method of claim 1, further comprising determining, if a target recording power recorded on the optical recording medium beforehand is smaller than the assigned recording power, to assign the target recording power as the recording power.

3. The optical recording medium recording control method of claim 1, wherein the levels of incidence of thermal interference are quantified from the detected variation amounts.

4. The optical recording medium recording control method of claim 1, wherein the detected variation amounts include variation amounts of a low level of a playback signal of the evaluation pattern at minimum-length marks of the evaluation pattern.

5. The optical recording medium recording control method of claim 1, wherein the recording power is assigned to a value for which the detected variation amount is at least smaller than the threshold value.

6. The optical recording medium recording control method of claim 1 wherein, with the pre-specified measured value of the correctable error rate, satisfactory recording can be implemented at a time of recording using a usual recording pattern and with recording power being varied in a stepwise manner.

7. The optical recording medium recording control method of claim 1, wherein the optical recording medium includes an optical disc which is capable of write-once recording.

8. The optical recording medium recording control method of claim 7, wherein the optical recording medium can be recorded by laser light with a wavelength between 500 nm and 700 nm.

9. The optical recording medium recording control method of claim 1, wherein the optical recording medium includes an optical recording medium which employs an organic dye.

10. The optical recording medium recording control method of claim 1, wherein the evaluation pattern includes a combination of minimum-length marks with spaces of various lengths.

11. A recording control device of an optical recording medium on which information is recordable by at least irradiation with laser light, the device comprising:
    a recording section which test-writes an evaluation pattern for evaluating levels of incidence of thermal interference at the optical recording medium, in which test-writing recording power is altered in a stepwise manner;

a reading section which reads the test-written evaluation pattern to obtain playback signals;

a binarization section which binarizes the playback signals;

a detection section which detects variation amounts of positions of the binarized playback signals relative to reference clocks; and an assignment section which finds, in advance, a variation amount that corresponds to a pre-specified measured value of a correctable error rate, sets the found variation amount as a threshold value for the detected variation amounts detected by the detection section, comparing the detected variation amounts and the threshold value, and assigns a recording power as high as possible at which the detected variation amounts are smaller than the threshold value.

12. The optical recording medium recording control device of claim 11 wherein, if a target recording power recorded on the optical recording medium beforehand is smaller than the assigned recording power, the assignment section assigns the target recording power as the recording power.

13. The optical recording medium recording control device of claim 11, wherein the levels of incidence of thermal interference are quantified from the detected variation amounts.

14. The optical recording medium recording control device of claim 11, wherein the detected variation amounts include variation amounts of a low level of a playback signal of the evaluation pattern at minimum-length marks of the evaluation pattern.

15. The optical recording medium recording control device of claim 11, wherein the recording power is assigned to a value for which the detected variation amount is at least smaller than the threshold value.

16. The optical recording medium recording control device of claim 11 wherein, with the pre-specified measured value of the correctable error rate, satisfactory recording can be implemented at a time of recording using a usual recording pattern and with recording power being varied in a stepwise manner.

17. The optical recording medium recording control device of claim 11, wherein the optical recording medium includes an optical disc which is capable of write-once recording.

18. The optical recording medium recording control device of claim 17, wherein the optical recording medium can be recorded by laser light with a wavelength between 500 nm and 700 nm.

19. The optical recording medium recording control device of claim 11, wherein the optical recording medium includes an optical recording medium which employs an organic dye.

20. The optical recording medium recording control device of claim 11, wherein the evaluation pattern includes a combination of minimum-length marks with spaces of various lengths.

21. The optical recording medium recording control method of claim 1, wherein the assigned recording power has a corresponding variation amount of a low level portion of a minimum-length mark which is a slice level that has been determined from the pre-specified measured value that enables a performance of satisfactory recording.

22. The optical recording medium recording control method of claim 4, wherein the detected variation amounts include a difference between the highest minimum value and the lowest minimum value of a low level portion of the playback signal of the evaluation pattern at the minimum-length marks of the evaluation pattern.

23. The optical recording medium recording control method of claim 5, wherein the variation amount corresponding to the assigned recording power does not exceed the threshold value.

24. The optical recording medium recording control device of claim 11, wherein the assigned recording power has a corresponding variation amount of a low level portion of a minimum-length mark which is a slice level that has been determined from the pre-specified measured value that enables a performance of satisfactory recording.

25. The optical recording medium recording control device of claim 14, wherein the detected variation amounts include a difference between the highest minimum value and the lowest minimum value of a low level portion of the playback signal of the evaluation pattern at the minimum-length marks of the evaluation pattern.

26. The optical recording medium recording control device of claim 15, wherein the variation amount corresponding to the assigned recording power does not exceed the threshold value.

27. The optical recording medium recording control method of claim 1, wherein the pre-specified measured value of a correctable error rate is a maximum measured rate of inner parity (PI) errors with which satisfactory recording is possible, such that pit length variations due to thermal interference do not occur.

28. The optical recording medium recording control method of claim 4, wherein the low level of the playback signal of the evaluation pattern at the minimum-length marks varies between a first variation low level and a second variation low level such that the variation amount is a difference value between the first variation low level and the second variation low level.

29. The optical recording medium recording control method of claim 1, wherein the pre-specified measured value of a correctable error rate is a measured rate of inner parity (PI) errors with which satisfactory recording is possible.

* * * * *